United States Patent [19]

Tawara et al.

[11] Patent Number: 5,555,160

[45] Date of Patent: Sep. 10, 1996

[54] LIGHT-GUIDING PANEL FOR SURFACE LIGHTING AND A SURFACE LIGHTING BODY

[75] Inventors: Nobuyoshi Tawara, Niihama; Takeshi Kojima, Tondabayashi, both of Japan

[73] Assignees: Nissen Chemitec Co., Ltd., Niihama; T. Chatani & Company Ltd., Osaka, both of Japan

[21] Appl. No.: 320,430

[22] Filed: Oct. 6, 1994

Related U.S. Application Data

[63] Continuation-in-part of Ser. No. 212,243, Mar. 14, 1994, which is a continuation of Ser. No. 64,828, May 19, 1993, abandoned, which is a continuation of Ser. No. 905,014, Jun. 26, 1992, abandoned.

[30] Foreign Application Priority Data

Jun. 27, 1991 [JP] Japan ................................. 3-183659
Dec. 6, 1991 [JP] Japan ............................. 3-108969 U
Feb. 28, 1992 [JP] Japan ................................. 4-078890

[51] Int. Cl.$^6$ .............................................. F21V 8/00
[52] U.S. Cl. ........................... 362/31; 362/27; 362/308; 362/330; 362/335; 359/49
[58] Field of Search ..................... 359/48, 49, 50; 362/26, 27, 31, 307, 330, 335, 308; 385/129, 901

[56] References Cited

FOREIGN PATENT DOCUMENTS 6-102414 4/1994 Japan.

*Primary Examiner*—Denise L. Gromada
*Assistant Examiner*—Alan B. Cariaso
*Attorney, Agent, or Firm*—Armstrong, Westerman, Hattori, McLeland & Naughton

[57] ABSTRACT

A new compact surface-lighting body having homogeneous luminance and high light intensity which is useful for electronic devices such as tablet-type television, lap-top personal computer or word processor with liquid crystal can be obtained by disposing at the one surface of a light-guiding panel which is solid optically transparent material and having a symmetric concave-plane synthesized from said concave face and two planes tangentially adjoined thereto, said synthesized face being tangent to any point on the slants each other, of same shape and size but symmetrically confronting two rectangular triangles at their acute apexes and lying on a common basic line and they are confronting so as to contact with said slants at a distance not less than one-tenth of the length of each slant apart from the confronting point of the both triangles, and said panel provides with a light-reflecting layer and a light scattering dots at its one face.

11 Claims, 16 Drawing Sheets

(cm)

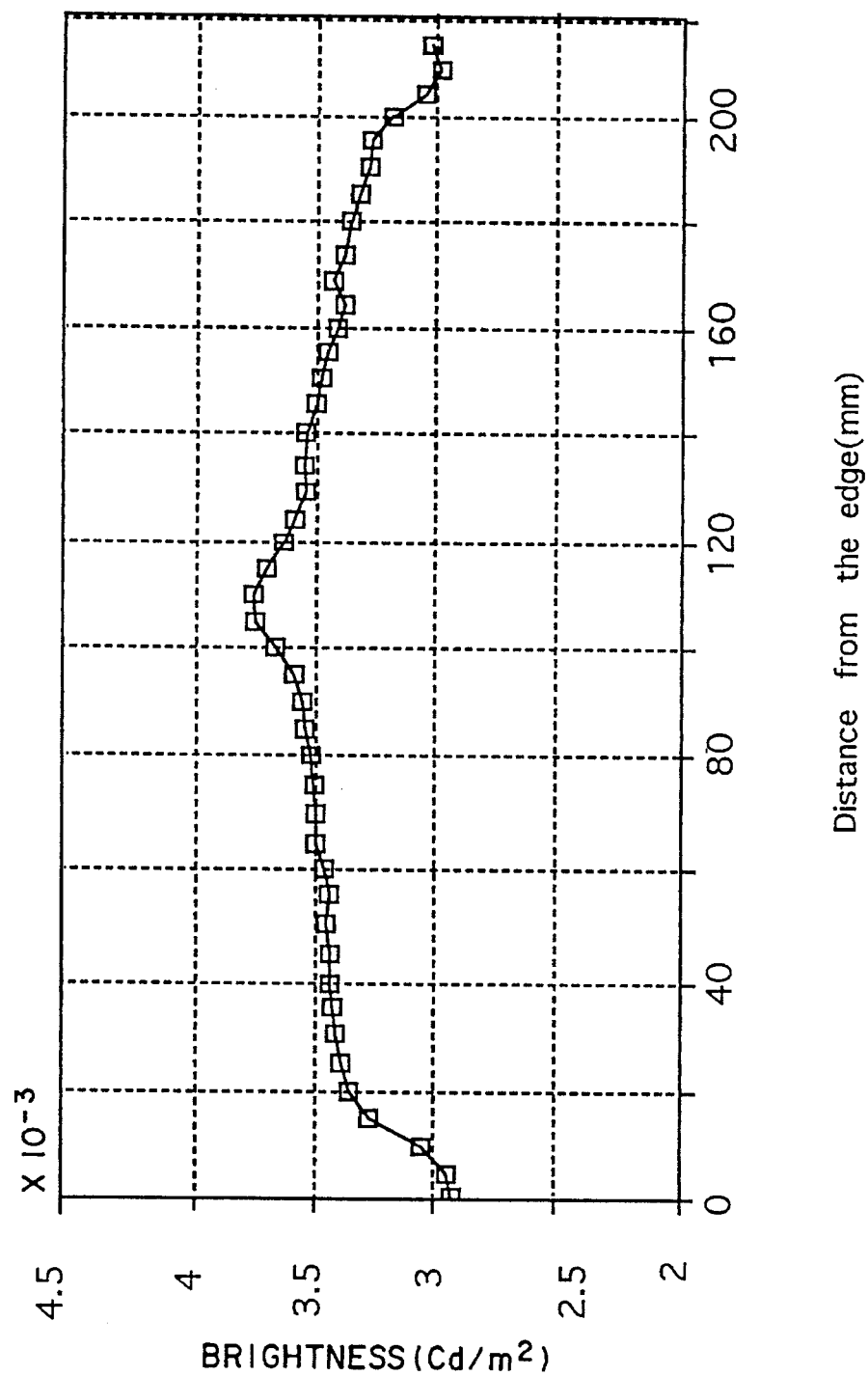

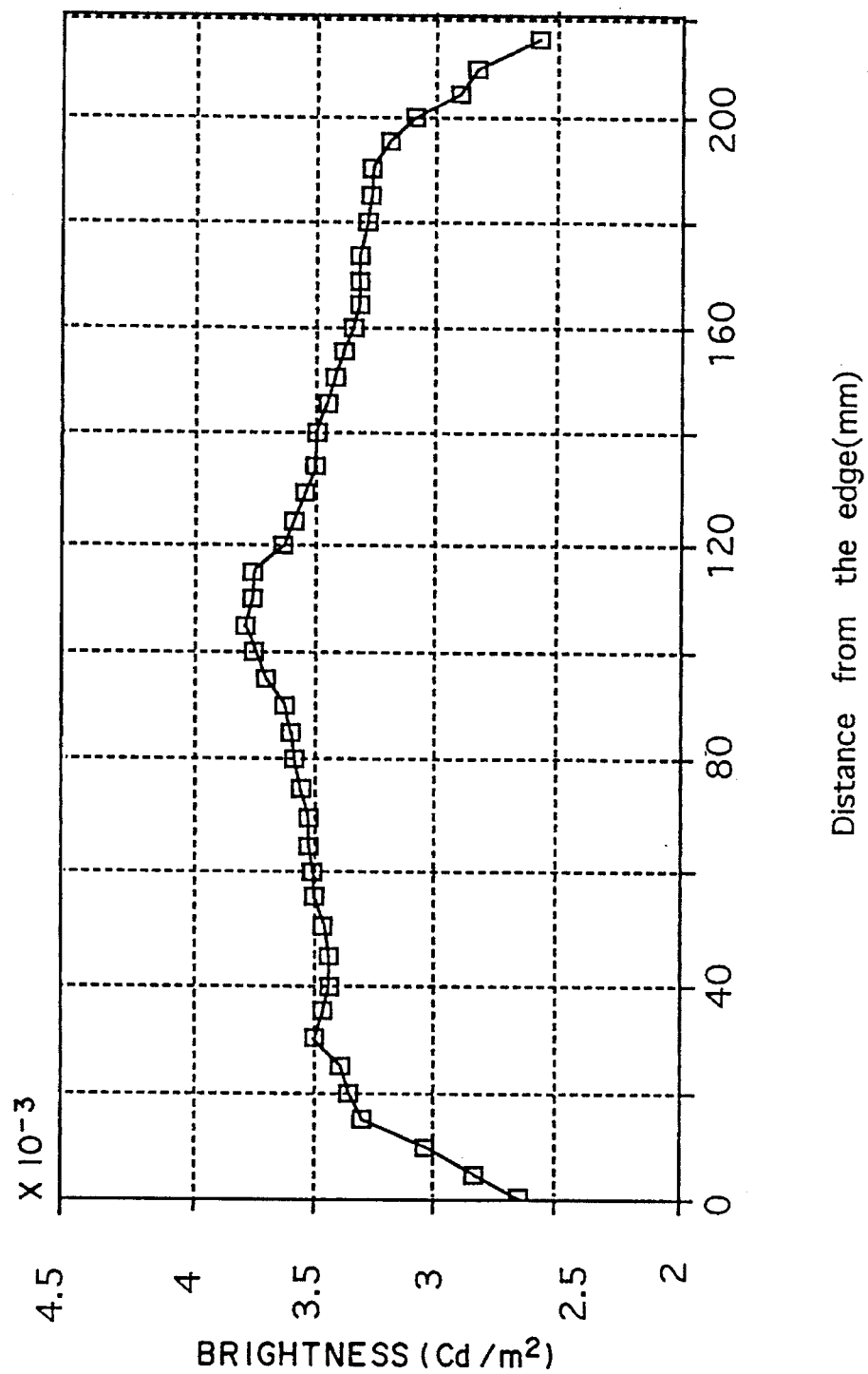

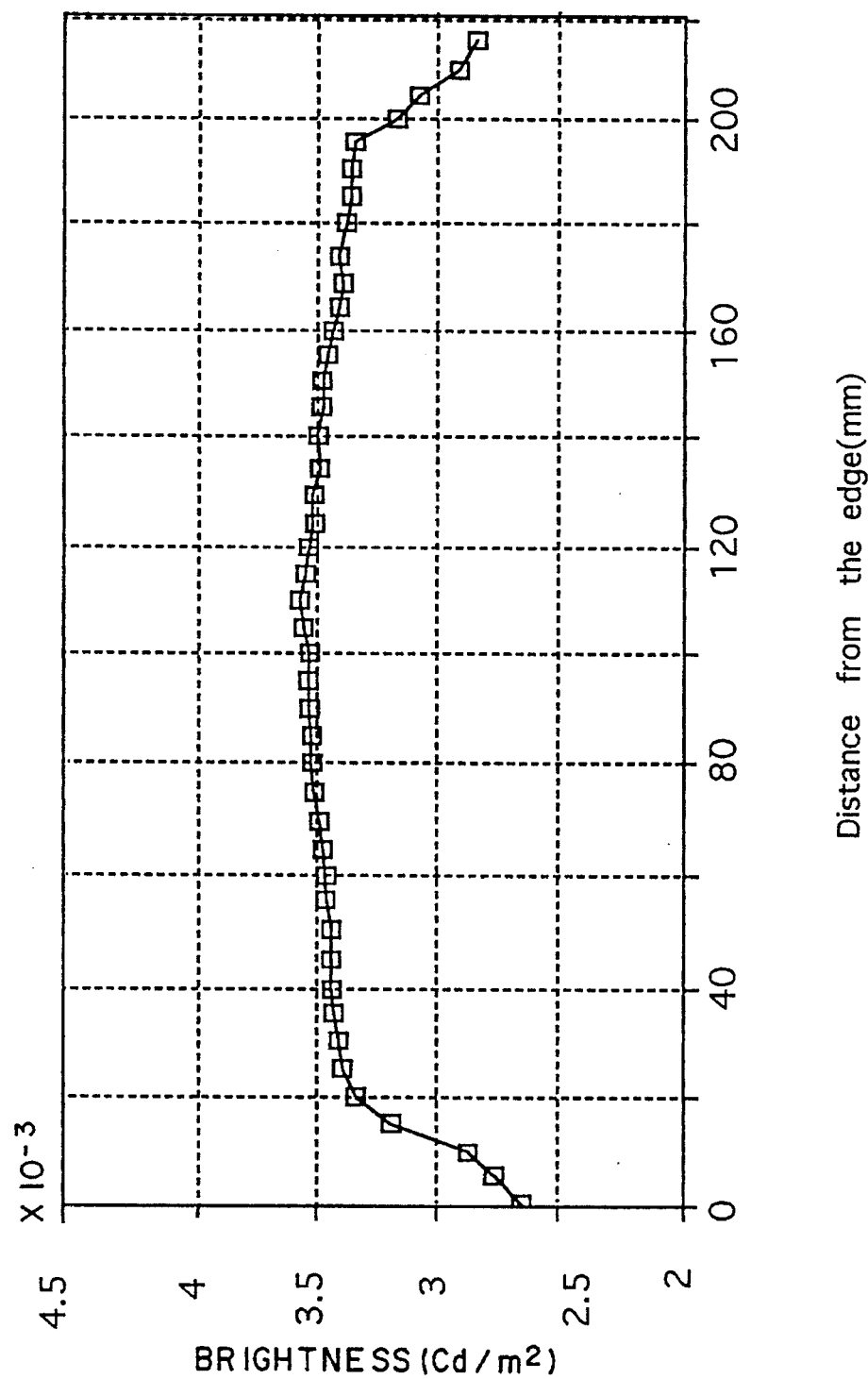

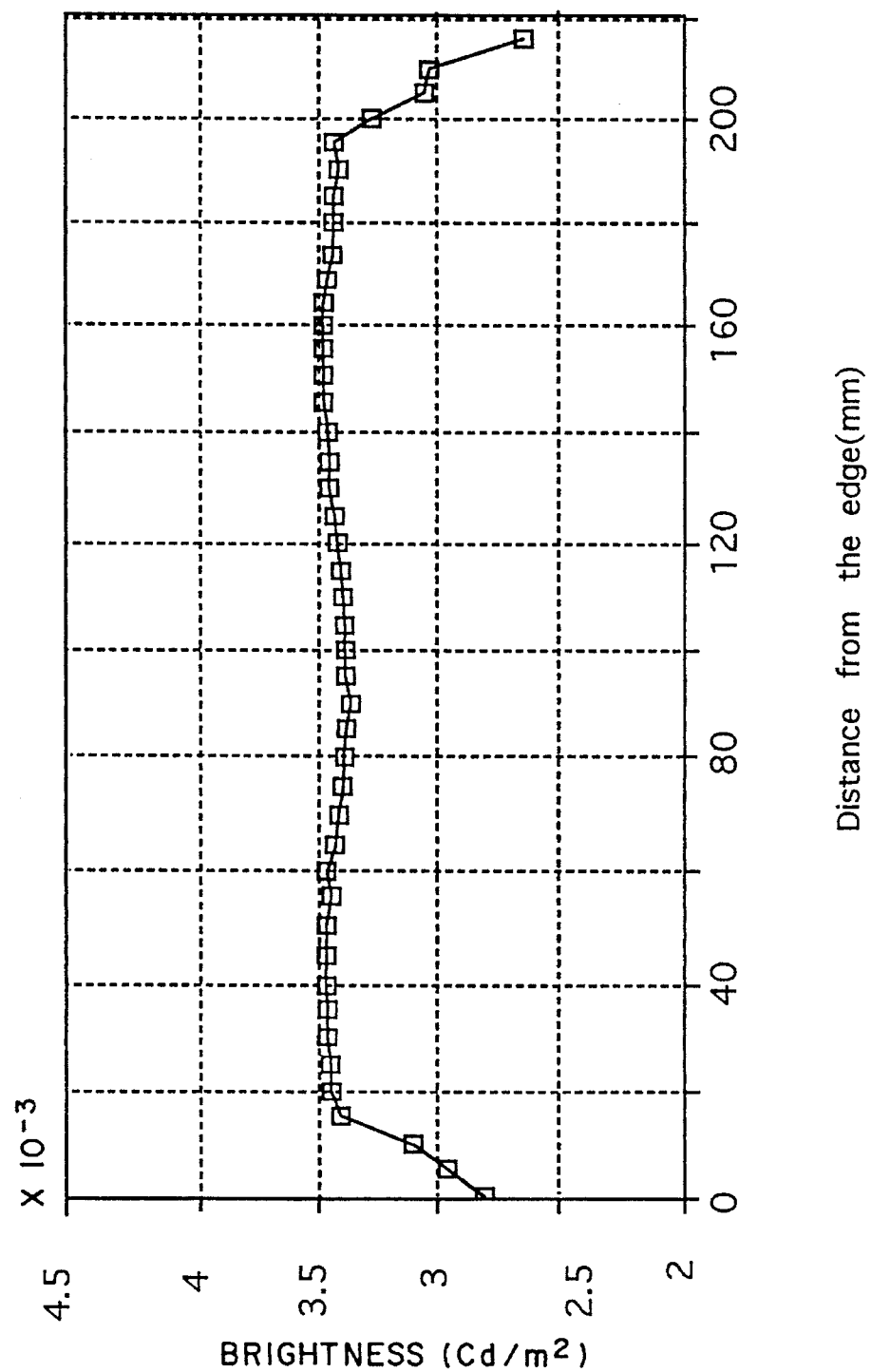

LIGHT-GUIDING PANEL FOR SURFACE LIGHTING AND A SURFACE LIGHTING BODY

This is a continuation in part of application Ser. No. 08/212,243, filed Mar. 14, 1994, which is a continuation of application Ser. No. 08/064,828, filed May 19, 1993, now abandoned, which is a continuation of application Ser. No. 07/905,014, filed Jun. 26, 1992, now abandoned.

TECHNICAL FIELD

This invention relates to a light-guiding panel for back lighting liquid crystal displays and more particularly to light guiding panels having high uniform brightness without brilliant or dark lines.

BACKGROUND OF THE INVENTION

Electric display devices provided with liquid crystal birefringent elements, commonly referred to as liquid crystal displays (LCD's), are characterized by their enhanced legibility, compact size and low electrical power requirements. LCD's are used extensively as optical display elements in digital watches and clocks, electronic calculators and electronic analytical equipment. LCD's, particularly those that display in color, are increasingly being used in place of cathode ray tubes (Brown's tube.) As advances in LCD design and fabrication techniques are realized LCD displays will increasingly become the output imaging device of choice in the near future.

Liquid crystal displays employ birefringent liquid crystals sandwiched between transparent sheets, glass or plastic sheets for example, to form liquid crystal elements. The transparent sheets receive Conductive coatings etched into character-forming segments through which an electric current is passed. An electric current passed through the liquid crystals is effective to cause them to become optically opaque. Thus, the segments, which may be segments of seven or more segment alpha-numeric displays, that are energized become optically opaque and prevent light from passing through the segments causing them to be visible. Display segments not energized by an electric current will remain clear and allow light to pass through.

Unlike other electro-optic output display devices, which include for example light emitting diode (LED) or fluorescent displays, liquid crystal elements themselves do not emit light. Thus, it is necessary to provide an external source of light to illuminate the LCD. This is done by reflecting ambient light off a reflective background or by providing a back lighting arrangement that projects illuminating light from the back side of the LCD through the liquid crystal elements.

Current back lighting devices, which are capable of achieving high and uniform illuminance, include so called common plane surface lighting bodies fabricated from single or plural laminated flat plates with painted, light scattering white dots covering one or more flat plate surfaces. The white dots are effective to reflect ambient light to provide back lighting to view the LCD. However, since ambient lighting may be dim or non existent altogether, these devices are often provided with light sources adapted to inject light beams into the flat plate edges to provide back lighting. The light beams travel through the flat plates at random angles with respect to the flat plate planar surfaces. If the beams strike a white dot the beams' trajectories are redirected to some degree perpendicular to the flat plane surfaces causing them to emit from the flat plates thereby backlighting the LCD elements.

Flat plate type common plane light-guiding panels tend to be quite thin with thin side edges for injecting the illuminating light. Thus, flat plate common plane light-guiding panels tend to be low in average luminance across the planar surface. Because of their low average surface luminance, common plane light guiding panels are most often used with monochromatic or black and white LCD's. Color LCD's require much greater average surface luminance making the use of common plane panels unsatisfactory.

Several modified light-guiding panel designs have been attempted to increase the average surface luminance. A wedge-shaped light-guiding panel, shown in FIG. 11, has been employed to provide increased surface luminance. Single wedge shaped light guiding panels provide increased luminance, however, the image area over which uniform luminance is achievable is quite small and unsuitable for the larger displays that are increasingly being demanded. The luminance can be increased by increasing the edge thickness to provide a greater coupling region for light coupling. This in turn requires that the incline angle be increased, the result being only a small increase in projected illuminating area while at the same time increasing the overall bulk of the display, making it unsuitable for many applications where a thin, cross-sectional component design is desirable.

A double-wedge light-guiding panel, which comprises, generally, two individual light-guiding panels disposed in optical communication with one another along abutting edges adjacent the wedges' acute angles, is shown in FIG. 12. The double-wedge configuration was proposed and fabricated to overcome the limitations of size and small projected area of illumination problematic with single wedge designs. Thus, the double wedge design provides a structure having a large image area and increased luminance (such as cold cathode discharge tube) at the outside edges of each of the two wedges opposite the wedges' acute angles.

The double-wedge configuration unfortunately has a defect described in the art as a brilliant line. A brilliant-line appears as a localized, longitudinally extending area of high intensity illumination adjacent the abutted edges of the two wedge structures.

At this point it becomes informative to discuss the various mechanisms of generation of the bright-line defect in prior art light-guiding panels.

A common characteristic among light-guiding panels having a bright-line defect is the presence of a discontinuity in the section profile of the light-guiding body. A discontinuity (that is, where a mathematical function defining the slope of the emitting surface contour is discontinuous at one or more locations) occurs, for example, at the intersection of two planes angularly displaced to one another and thus not coplanar.

In prior art light-guiding panels, the bright line defect generation mechanism depends on the configuration of the wedge shaped components employed to form the light-guiding panel. Looking the FIG. 7 there is shown a light-guiding panel generally indicated by the numeral 30. The panel 30 comprises light transmitting body 31 having a complex face 32 composed of a plurality of pairs of refractive planes symmetrically formed in the face 32 and designated by the numerals 34 and 35 and by planes defining the segments AO and OB, respectively. The planes 34 and 35 define a discontinuous emitting surface $S_E$, having local discontinuities $D_1$ and $D_2$ where the planes AO and OB are caused to intersect. Above the surface $S_E$ is another refractive medium, air for example, having a refractive index less than the refractive index of the body 31.

The body 31 also includes symmetrically disposed light input surfaces 36 adapted to receive light from light sources 38. Reflective surface $S_R$ extends across the lower surface 39 of the body 31. Light scattering dots 40 are applied evenly on the surface 39. A reflective coating 41 is also disposed in optical contact with the surface $S_R$, which may include a metallic mirror-like coating or a white paint coating. Thus, light produced by the light sources 38 is pumped into the body 31 through the input surface 36. Light rays entering at a trajectory below a plane parallel to the reflective surface $S_R$ will generally be incident on the surface $S_R$ and be reflected therefrom such that the ray is caused to be incident on the emitting surface $S_E$, and emitted therefrom. Light rays entering at a trajectory above a plane horizontal to the surface $S_R$ will generally be incident directly at the upper surface 32 and refract therethrough. Some rays may be reflected by total internal reflection at the upper surface 32 and back to the surface $S_R$ where they are reflected back through the emitting surface $S_E$.

FIG. 8 provides a vector illustration of the light passing through the surfaces AO and OB and the cause of the bright-line defect. Reference lines DOF and GOI, which are perpendicular to the faces AO and OB respectively and which pass through the point O, provide lines of reference for an analysis of light incident at the surface 34 and 35. Rays emitted from the plane face AO, have an angle smaller than the critical angle $I_{AO}$. Where the light-guiding body is made of polymethyl methacrylate, a plastic material commonly used for fabricating light-guiding bodies, the critical angle is about 42.1°. The incident rays within the angle COD are emitted from the point O and refracted within the angular displacement AOF. Similarly, all rays incident upon the surface OB and having an angle smaller than the critical angle $I_{OB}$, including the rays within the angle HOG, will be emitted from the surface OB within an angular displacement BOI. As can be seen illustratively in FIG. 8, there is a region of emitted light overlap defined within the angular portion FOI. The intensity of the rays at the point O within the region FOI is the total of the ray intensity from the plane faces AO and OB. The liminance (cd/m²) in the overlap region is greater than the average luminance of each face AO or OB individually and less than or equal to the arithmetic total of the components of the rays. The luminance is expressed mathematically by Formula III:

$$\frac{LF_{OA} + LF_{OB}}{2} < cd \leq FL_{OA} + LF_{OB} \qquad \text{III}$$

Where:

$LF_{OA}$=Luminance on the face of OA; and, $LF_{OB}$=Luminance on the face of OB.

Thus, the luminance of the light-emitting face within ∠FOI becomes remarkably greater than the luminance of faces OA or OB. The luminous strength of the line is dependent on the extent to which the plane of the surface defining OB is inclined with respect to the plane of the surface defining OA, the angular displacement being represented by the angle α. As α approaches 0°, that is, as the surfaces AO and OB tend toward a common plane defining AOE, the luminous strength of the bright-line tends toward the same strength as the luminous strength of surfaces AO and OB.

Other light-guiding panel configurations have similar bright-line generation mechanisms. A second common construction for light-guiding panels which also contains a bright-line defect is shown in FIG. 9 and is generally designated by the numeral 43. The light-guiding panel shown in FIG. 9 includes a light-guiding body 44 having an upper surface 45 defining an emitting surface $S_E$. The emitting surface $S_E$ comprises a plane surface 46 defining line segment AO and an adjacent intersecting concave surface 47 defining arc segment OB. The arc segment OB may be described by a non-linear function such as a parabolic or hyperbolic function. The point of intersection O is a point of discontinuity between the function of the line segment AO and the arc OB and is the situs of a bright-line defect.

The mechanism of the generation of a brilliant line in the light-guiding panel shown in FIG. 9 is smilar to the defect generation mechanism of the panel shown in FIG. 7. The vector illustration of the bright-line defect of the light-guiding body shown in FIG. 9 is shown in FIG. 10. For the purpose of describing the defraction of light incident at the arc portion OB, reference orthogonal axis are included to assist in showing the trajectory of light being emitted from the surface $S_E$. One of the axes has its point of origin at O and one of the axes, OB', is tangent to the arc OB. Line segment IOG, is perpendicular to the tangential plane OB' and intersects at the point O. All right rays incident on the arc portion OB' having an angle smaller than the critical angle $I_{OB}$, (∠GOH), will be emitted as the refracted light within the angular portion FOI, As can be seen in FIG. 10, the refracted light in ∠FOI includes components of light refracted from the plane OA and the concavity OB. The intensity of the rays at the point of intersection O is the total of rays from the faces OA and OB. The luminance, (cd/m²), of the bright line is greater than the average luminance of each face and equal to or smaller than the arithmetical total of the both as shown by the following Formila IV:

$$\frac{LF_{OA} + LC_{OB}}{2} < cd \leq LF_{OA} + LC_{OB} \qquad \text{IV}$$

Where:

$LF_{OA}$=Luminance on the face of OA $LC_{OB}$=Luminance on the concave OB

Thus, the luminance of the light-emitting face within ∠FOI becomes remarkably greater than that of plane face AO or concave face OB. The ∠FOI is equal to the angle ,α, of EOB between the plane OA and the tangential plane OB' at the point O which is the junction with the concavity OB. Therefore, as the angle α tends toward 0° the angular displacement of ∠FOI decreases, reducing the luminous strength of the bright-line defect. At α=0° the plane defined by line segment OB' is caused to lie in the same plane as the plane defining line segment AO so as to define a plane defining line segment AOE. Where the light emitting surface $S_E$ comprising the plane OA is tangentially connected to the concavity OB at the junction point O, there will be no bright-line.

Attempts have been made to reduce the brilliant line defect in wedge configured light-guiding panels by causing the wedge to be truncated adjacent the acute angle edge and then abutting the truncated edges. This configuration is shown in FIG. 13. This arrangement, however, results in a dark-line defect adjacent the abutting edges E. Attempts to reduce the dark-line defect have included causing an arcuate valley to be disposed adjacent abutting portions of the truncated element device as shown in FIG. 14.

Heretofore, the prior art light-guiding panels employing some conbination of wedge shaped elements have not provided uniform illumination thought acceptable for such demanding deployments as back lighted LCD television screens.

In this circumstances, such symmetrical wedge-shaped light-guiding panel has not been practiced notwithstanding its merit of high luminance and broad image area.

The object of the present invention is to provide a novel light-guiding panel having high average luminance and a broad image area without the generation of a brilliant-line or dark-line defect, and to provide a new surface-lighting body by using such new light-guiding panel.

Moreover, the present invention is further directed to providing a compact surface lighting system by decreasing the weight and volume of the lighting body and to providing a structure to allow the disposal of an associated integrated circuit (IC) assembly into the space resulting from the minimization of the panel.

SUMMARY OF THE INVENTION

The foregoing problems of the prior art have been overcome by the light guiding panel of this invention. The light guiding panel of the claimed invention avoids the problem of the generation of the brilliant or dark line by providing a light guiding panel having a synthesized concavity comprising two plane protions tangentially adjoined together with a proper rate between the concavity and the plane.

In the basis of the above findings, the present invention exists in a light guiding panel for surface-lighting comprising optically transparent material in which at least one surface of said panel is composed of a symmetrical and continuous concave-plane face. The symmetrical and continuous concave-plane face includes said concave face and two planes tangentially adjoined thereto, said concave-plane face circumscribed with a specific point of each slant of two rectangular triangles, having the same shape and size but symmetrically confronting at their pace acute apexes and lying on a common basic line so as to contact with said slant at a distance not less than ⅒ of the length of the slant from the confronting point of the both triangles. The details of the invention now will be explained hereinafter.

BRIEF DESCRIPTION OF THE DRAWINGS

The term "section" used in this paragraph hereinafter means vertical section.

DETAILED EXPLANATION OF THE INVENTION

Figure 1:
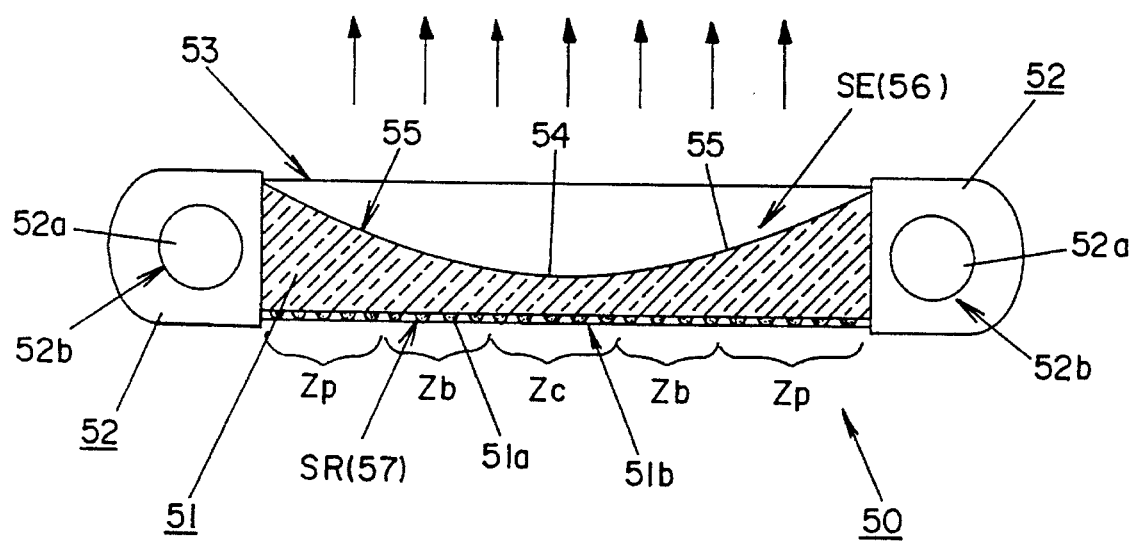
FIG. 1 is an explanatory section view of a surface-lighting body by composing an invented solid-type light-guiding panel according to the present invention.
Figure 2:
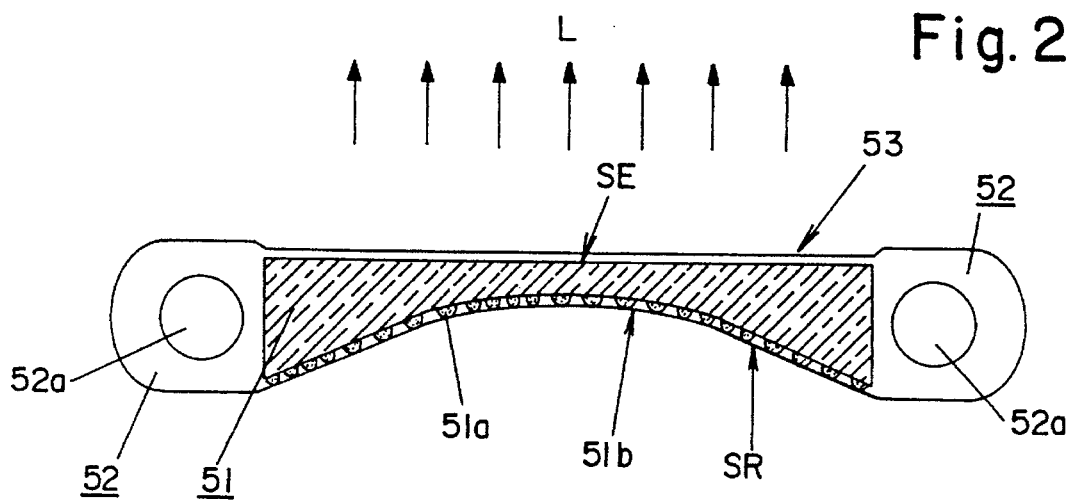
FIG. 2 is an explanatory section view of another surface-lighting body with a light-guiding panel according to the present invention.
Figure 3:
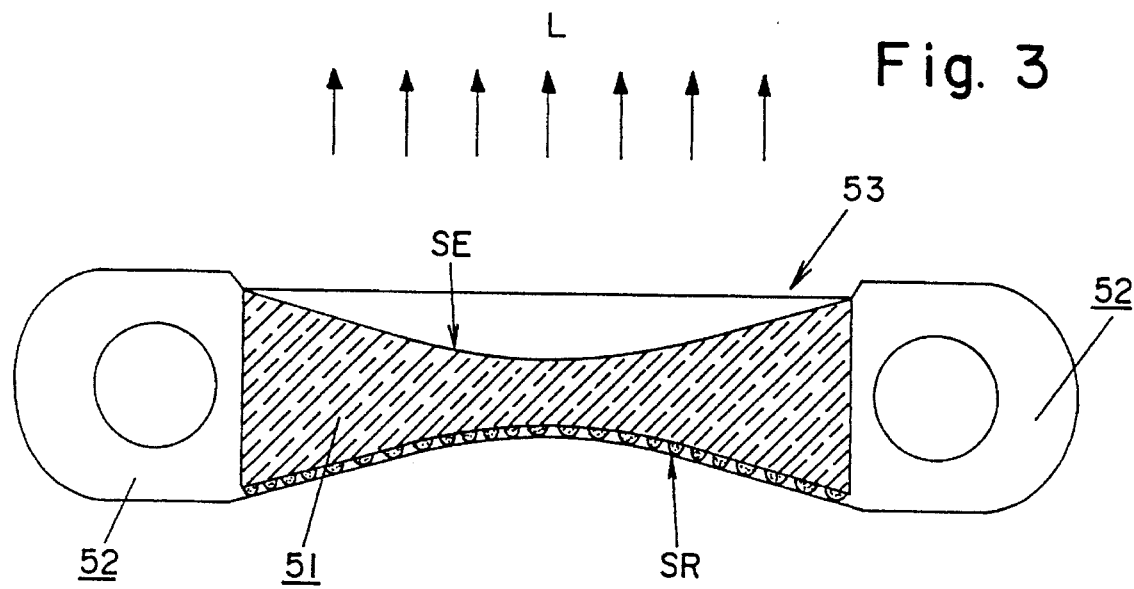
FIG. 3 is an explanatory section view of further surface-lighting body with a light-guiding panel according to the present invention.

Looking now at FIGS. 1–3 there are shown side cross-sectional views of different embodiments of light-guiding panel assemblies of the claimed invention which generally designated by the numeral 50. The light-guiding panel assembly 50 compries a transparent light guiding panel body 51, a light source assembly 52 and a light diffusing covering 53.

The body 51 is transparent within the range of 400–700 nm, wherein scattering of light induced in the body 51 is negligible. Typical materials exhibiting these optical characteristics include clear glass and transparent plastics such as polymethyl mathacrylate, methyl methacriate, styrene co-polymers and other organic plastics. These latter materials are castable easily machined and have a specific gravity of about half that of glass, making their use in weight restrictive apprications desirable. Opaque and opalescent glasses and plastics are paticularly unsuitable in that these materials tend to substantially attenuate the induced light, thereby reducing the luminance potential.

The light-guiding panel body 51 may be prepared by molding casting materials such as methyl methacrylate in appropriate stainless steel molds or molds fabricated of other materials having adequate release properties. Castable panel body material is introduced into the mold and, where material hardening is thermally induced, the molds are heated. Where material hardening is chemically induced, the molds are allowed to remain closed for a predetermined period of time. The panel body blank is then removed from the mold and prepare for cutting and polishing if necessary for final use.

Alternatively, the panel body blank may be provided by flat plate stock which is machined and polished to the final body profile. This method however tends to be inferior to the casting method with respect to cost and reproducibility. The light guiding panel body may be a hollow body, the light guiding panel may be formed by bending or pressing acrylic plate at a temperature higher than its glass transition point in appropriately shaped bending molds.

The light-guiding panel body 51 includes two large surfaces, one of which functions as a light emitting surface $S_E$ and the other functions as a light reflecting surface $S_R$. At least one of the two surfaces $S_E, S_R$ is formed to have a predetermind surface profile.

FIG. 1 shows an example of the light-guiding panel body 51 which includes a lawer flat surface to be a light reflecting surface $S_R$ and an light emitting surface $S_E$ having a predetermined surface profile. In this case, the reflecting surface $S_R$ may be a curved surface, as shown in FIG. 3, depending on the required lighting and package characteristics sought for the LCD.

FIG. 2 shows an example of the reverse of FIG. 1, that is, the body 51 includes a upper flat emitting surface $S_E$ and a lawer reflecting surface $S_R$ having a predetermined surface profile.

During a panel body fabrication the reflecting surface $S_R$ is formed to be reflective by applying light scattering dots 51a in optical contact with the surface and by adhering reflective sheet 51b to the surface.

The predetermined surface profile depends on a variety of parameters regarding the LCD package 50 including the desired area of illumination, illumination intensity and package size. Also of considerable importance is the particular light source 52a employed for light-guiding panel illumination.

The predetermined profile is a synthesized symmetric surface, denominated herein as a concave-plane face profile. These concave-plane face profiles comprise a symmetric curved portion 54, according to the surface description described above, adjoined tangentially to symmetrically disposed adjacent planar portion 55, example of which is shown most clearly in FIG. 4, where a light guiding body is designated by the numeral 51.

Figure 4:
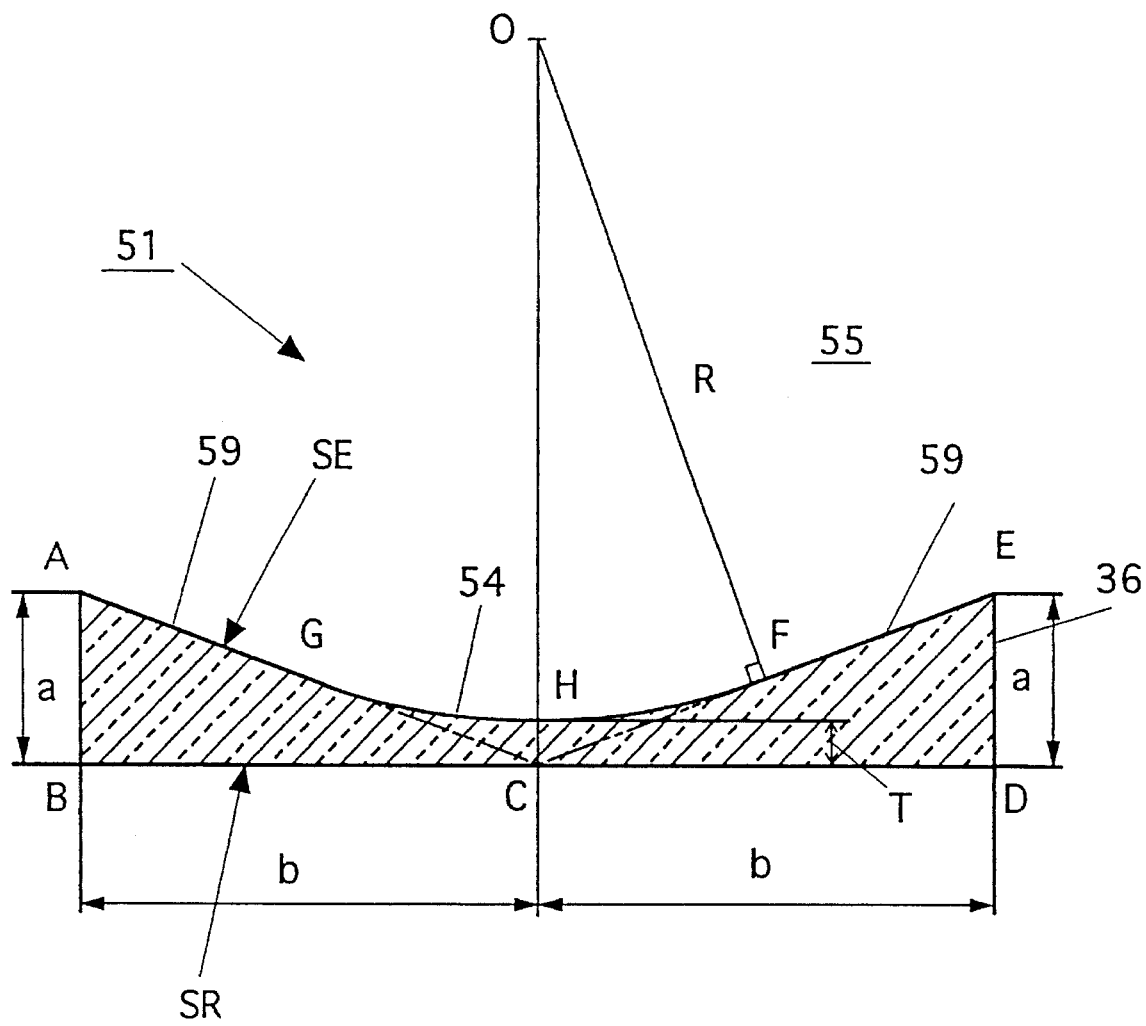
FIG. 4 is a schematic section view of an example of a solid-type light-guiding panel body according to the present invention.
Figure 12:
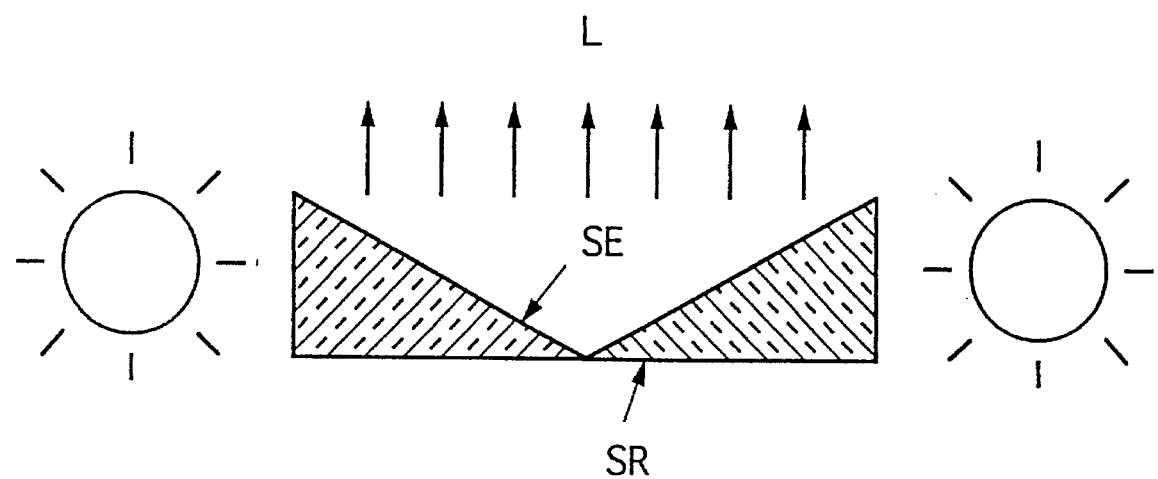
FIG. 12 is a diagrammatic section view, of a symmetrical, edge-shaped light-guiding panel, wherein a pair consisting of two unit light-guiding panel bodies used in FIG. 11 are confronted each other at their acute apexes.
Figure 13:
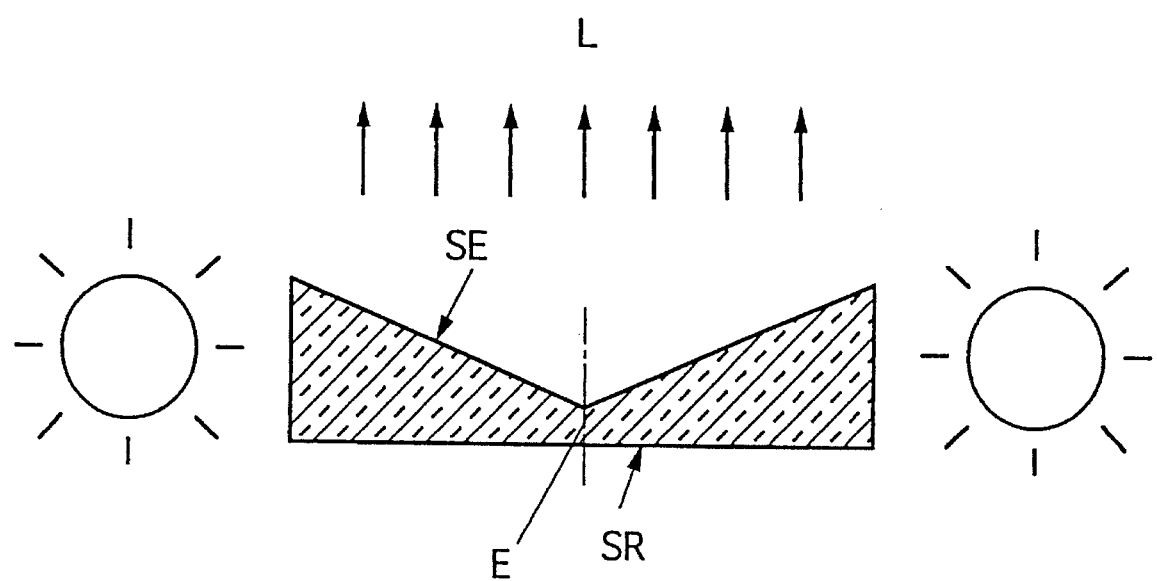
FIG. 13 is a similar figure with FIG. 12, but in which each apex being cut away.
Figure 14:
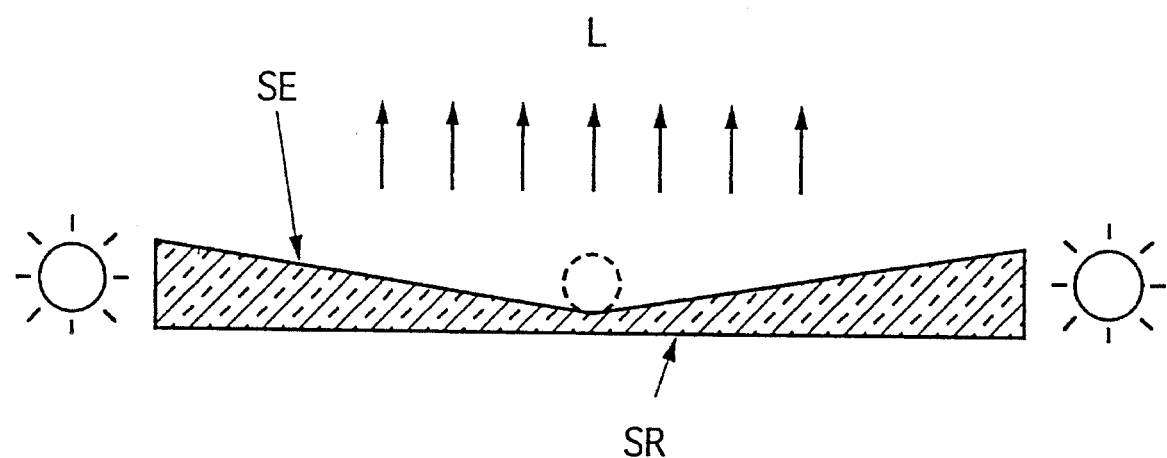
FIG. 14 is a modification of the light-guiding panel of FIG. 13 in which the confronted part of both panel bodies is rounded to a small circular arc.

As shown in FIG. 4 the body 51 includes the surface to be an emitting surface $S_E$ comprising two distinct portions, the centrally disposed curved portion 54 ane the pair of symmetrically disposed planar portions 55. As is indicated in FIG. 4, the synthesized body comprises features of the adjoined wedge type devices, as shown in FIG. 12.

The concave portion 54 may be a circular generated portion, which is defined by radius R, having a central point O, and caused to be tangent with the hypotenuses AC and CE at points G and F respectively. It is important to note that the slope of the circular portion at points G and F are equivalent to the slope of the hypotenuses AC and CE. Thus, there are no discontinuities that would result in bright line defects at the points G and F. The advantage of concave-plane configuration over a configuration with only a circular defined surface is uniform, high intensity illumination with a lower profile package.

Alternatively, the profile configuration of the concave portion 54 of the light-guiding body 51 may be generated according to other non-linear functions, including a parabola.

The physical configuration of the light guiding bodies emitting surface $S_E$ profile shown in FIGS. 1 and 3 may be mathematically modeled. The ability to conveniently mathematically model the surface profile assists in the design of the light guiding panels. Where the concave portion is a circular arc, the radius (R) of the tangential circle as well as other structural features may be calculated according to the Formulae I, below, when the thickness and breadth of each symmetric wedge ABC and CDE, shown in FIG. 4, are a and b, respectively, and the thinnest portion at the center is T.

Formulae I $$\angle OFC = \angle EDC = 90° \quad \text{I-1}$$

-continued $$\angle OCF = \angle ECD = 90° \quad \text{I-2}$$

$$\angle COF = \angle OCF = 90° \quad \text{I-3}$$

From formulae I-2 and I-3, $$\angle COF = \angle ECD \quad \text{I-4}$$

Therefore, from formulae I-1 and I-4 it is apparent that $\Delta COF$ and $\Delta ECD$ are similar, and since a, b, and T are given condition, then:

$$(R+T):R = \sqrt{a^2+b^2} : b \quad \text{I-5}$$

$$R\sqrt{a^2+b^2} = Rb + Tb \quad \text{I-6}$$

$$R = Tb/(\sqrt{a^2+b^2} - b) \quad \text{I-7}$$

However, there are numerous concave-plane which satisfy the given conditions of a, b, and T for equation I-1, above. If c is defined as $0<c<T$, then the concave-plane defined will be given according to the equation I-8, below. As the smaller the value of T-c, the smaller the radius R of the circumscribed circle and the circumscribing point will approach to the center.

$$R = (T-c)b/[\sqrt{(a-c)^2+b^2} - b] \quad \text{I-8}$$

(provided $0 < c < T$)

Alternatively, if the concavity is parabolic the points of tangency of the parabolic curve with the plane portions AC and CE, are derived from the given conditions and the following Formulae II (1–9), below.

Formulae II $$y_1 = (a/b)x \quad \text{II-1}$$
$$y_2 = \alpha x^2 + T \quad \text{II-2}$$

(wherein T is the thickness at the thinnest portion.)

When $y_1=y_2$, Formula II-2 may be substituted into II-3 and the value of $\alpha$ can be calculated as follows;

The co-ordinate of the point of the intersection is defined as follows;

$$(a/b)x=\alpha x+T \quad \text{II-3}$$

Thus, from the tangential condition, $$[a/-b]^2-4\alpha T=0 \therefore \alpha=(1/4T)\cdot[a/b]^2 \quad \text{II-4}$$

$$\therefore y=(1/4T)\cdot[a/b]^2\cdot x^2+T \quad \text{II-5}$$

The co-ordinates of tangential point of parabolic curve and plane portion AC and CE is followed $$(1/4T)\cdot(a^2/b^2)\cdot x^2-(a/b)x+T=0 \quad \text{II-6}$$

$$[(a/b)x-2T]^2=0 \quad \text{II-7}$$

$$\therefore (a/b)x=2Tx=2Tb/a \quad \text{II-8}$$

Thus, y is:

$$y=(a/b)[2Tb/a]=2T \quad \text{II-9}$$

But, there are numerous parabolas which satisfy the above conditions a, b and T. Thus if c is defined as $0<c<T$, the above formula II-5 may be modified into the following formula II-11, and the circumscribing point will approach the center as the value (T-c) becomes smaller, provided $0<c<T$.

$$y_2 = \{1/4(T-c)\} \cdot [(a-c)/b]x^2 + (T-c) \qquad \text{II-10}$$

There are numerous curve generating functions suitable for use to generate a panel body surface profile. These include the mathematical expressions for conical arcs such as hyperbola or elliptic arcs, curves of trigonometric fuction, catenary (hyperbolic cosine curves), curves of cycloid, curves of trochoid, exponential curves, involute curves and asteroid curves. Any of these functions may be used for generating the concave surface of the guiding body, provided that the resulting profile is suitable for the application and that the surface generated is symmetrical about the center axis of the body, is convex and is a one dimensionally increasing function curve.

Preferable configurations exist for the light guiding panels. There are particular shapes and ratios of dimension of the body 51 that will provide the most even illumination or allow a designer to preferentially cause a particular region of the illumination plane to have luminance less than or greater than the average luminance of the illumination plane. One such relationship of shapes includes the ratio of the distance from the point of conjunction of the apices of the wedge ABC and CDE to the point of tangency G,F of the concave portion to the length of the hypotenuse, that is, referring to FIG. 4, the ratio of the distances C–G and C–F to the length of the hypotenuses AC and CE. This ratio should be 1/10 or larger, and preferably, 1/5 to 2/3. If the distance is less than 1/10 of the lengths of the hypotenuse, uniform luminance will most likely not be achieved.

The reflective dots applied on the surface $S_R$ of the light guiding panel body 51 comprise light scattering matter such as white pigment, metalic powder or the like and transparent polymer such as acrylic resin. $TiO_2$ is preferable as a white pigment. The reflective dots 51a are generally printed on the surface $S_R$ by a method of silk screen printing which is well-known in the art. In this invention, the reflective dots 51a are printed so that the density of the dots may varies corresponding to a configuration of the panel body 51, more particularly, the density of the dots on a central zone including the thinnest portion of the body 51 and on each peripheral zone near a light source 52a are relatively high compared with the density of the dots on other zones (hereinafter referred to as "intermediate zones") between the central zone and the periferal zone, and it is preferable that the density of the dots on the central zone is relatively higher than the density of the dots on the peripheral zone. Each intermediate zone includes the following specific portion or the opposite portion thereof on the opposite side. The specific portion means a portion that the planer face contacts the concave face tangentially. Afrter all, the preferable pattern of the varying density of the dots from one light source to the other light source becomes to be "middle—low—high—low—middle". And it is more preferable that the density varies gradually, therefore, each boundary between high density zone and low density zone is unclear.

The density means the ratio of dots' area to a unit area of surface $S_R$ of the panel body 51. Accordingly, a preferable ratio is as follows:

the central zone: 50–90% the periferal zone: 60–75% the intermediate zone: 30–70%

FIGS. 6(A–E) provide empirical data showing the effect of varying the point of tangency to a fixed length hypotenuses in addition to the above pattern of dots' density distribution. The experimental apparatus resembled the embodiment shown in FIG. 1 and included the light guiding panels having overall dimensions of 266 mm in length, 212 mm in width 7 mm thick. The light guiding panels were of the concave-plane type providing a central circular arc and adjacent inclined planes. The radius of curvature of the circular arc was varied so as to effect varying points of tangency of the circular arc with the plane portions. The panels were edge lightd by two cold cathode discharge lamps as shown in FIG. 1.

The experimental apparatus also included means for measuring the relative intensity at a plurality of locations across the width of a light guiding panel at 5 mm increments. The graphs indicate the relative intensity, measured in $cd/mm^2$, at each location measured from a fixed reference edge. As can be seen from the FIGS. 6(A–E), as the ratio approaches the range of 1:9.5 to 1:6.13 the intensity across the face of the panel becomes most uniform. Ratios less than 1:6.13 result in the illumination adjacent to and above the concave portion to becoming less than the average illumination. As the ratio tends to from 1:9.15 to 1:23, the luminance adjacent to and above the concave portion increases with respect to the average surface luminance across the face of the light guiding panel.

Figure 6D:
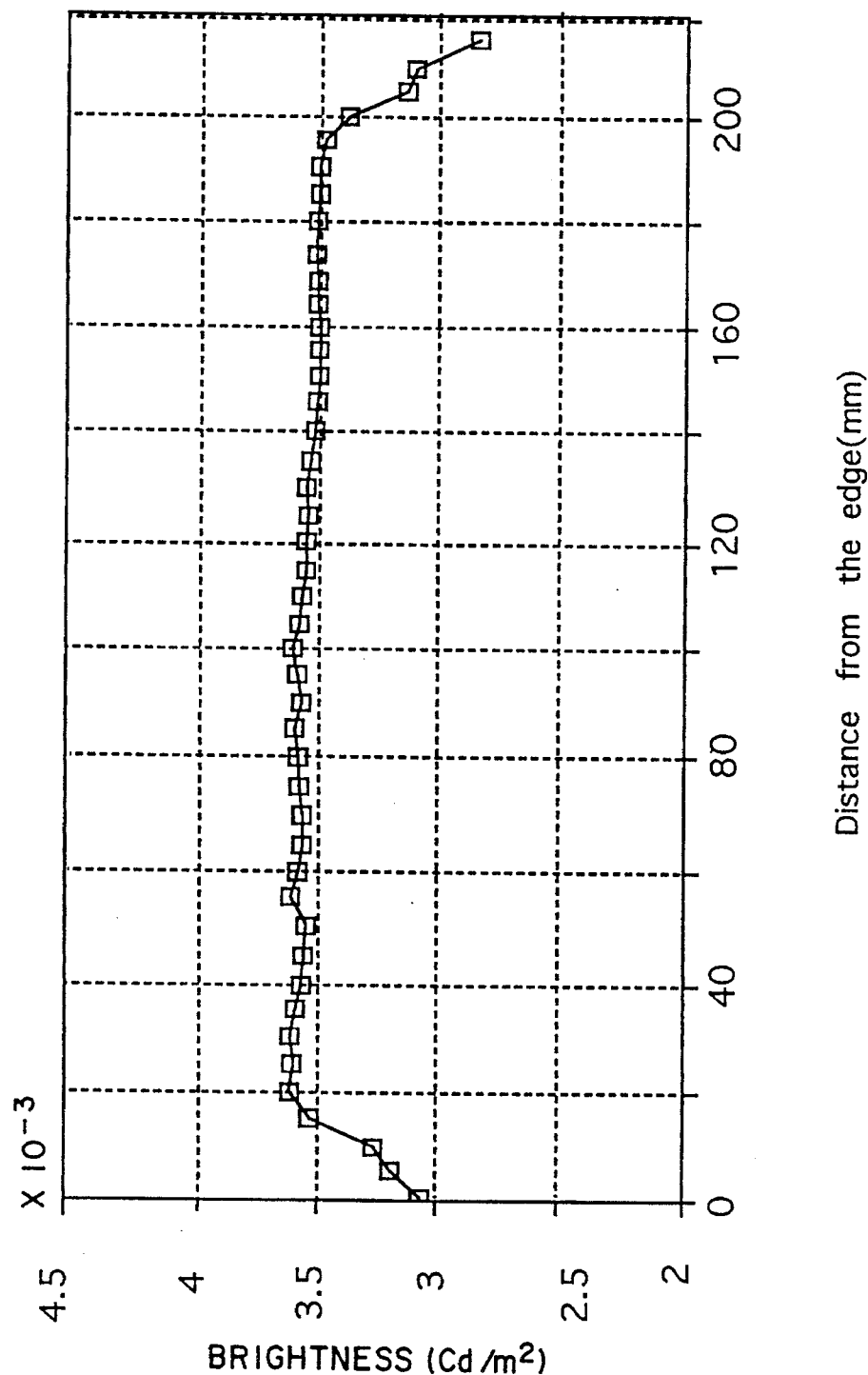
FIG. 6 (A–E) is are graphs showing luminance curves of the tested panels having various curvature.
Figure 7:
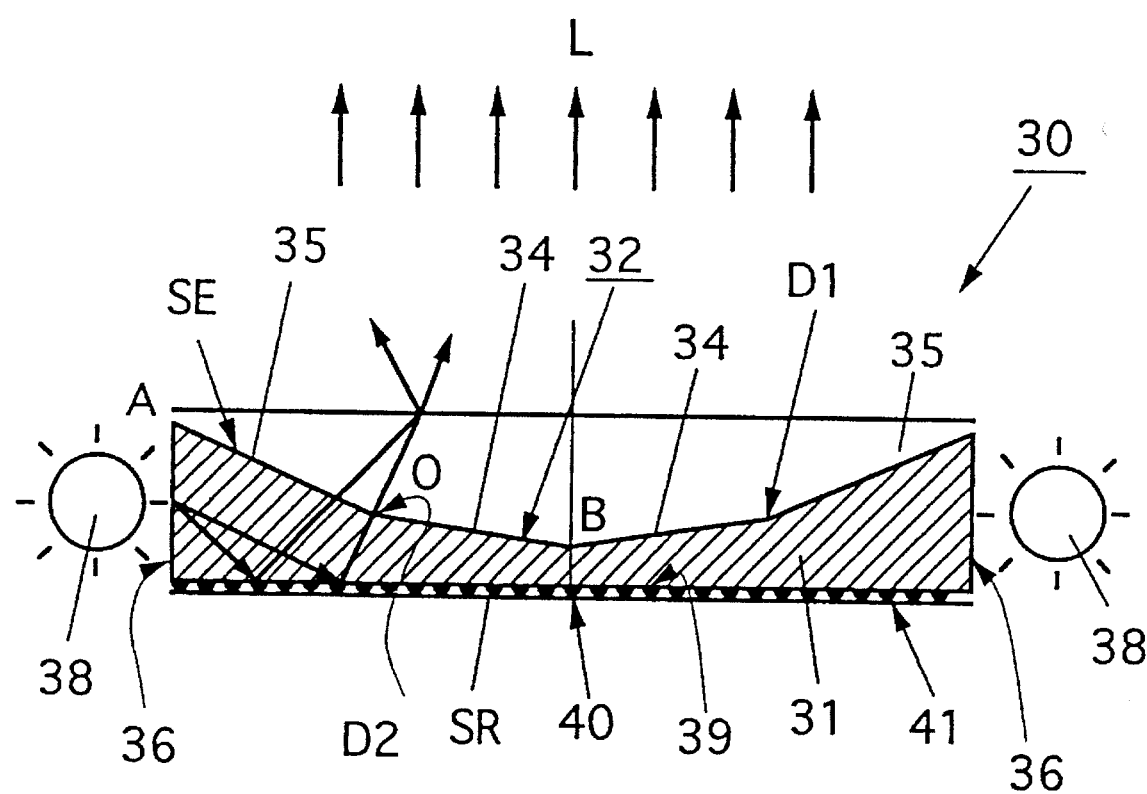
FIG. 7 is an explanatory view of a quasi (pseudo)-symmetrical wedge-shaped light-guiding panel composed of four planes.
Figure 8:
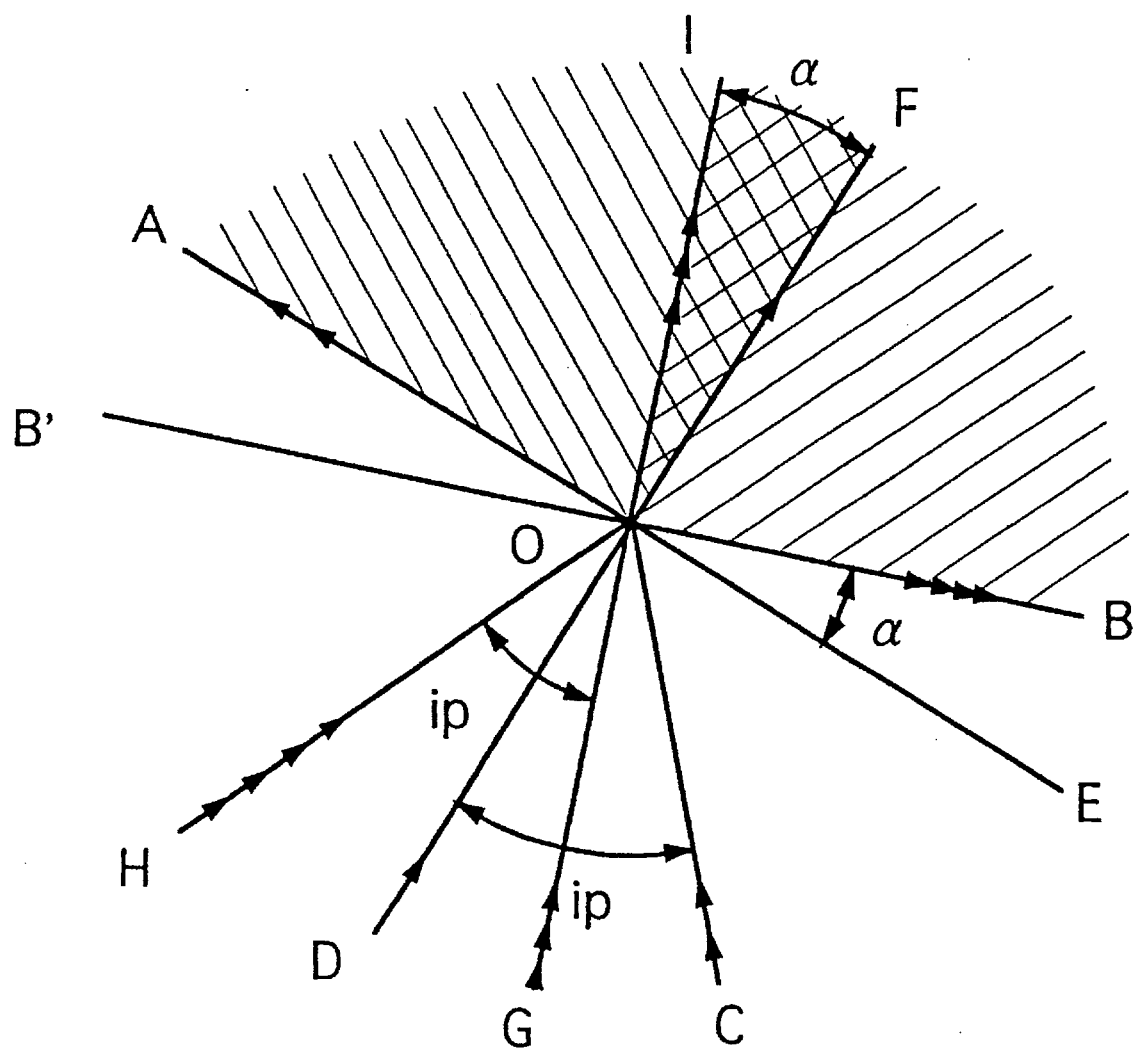
FIG. 8 is an explanatory view showing the behavior of the light at the light-emitting surface in a light-guiding panel composed of two planes intersected together.
Figure 9:
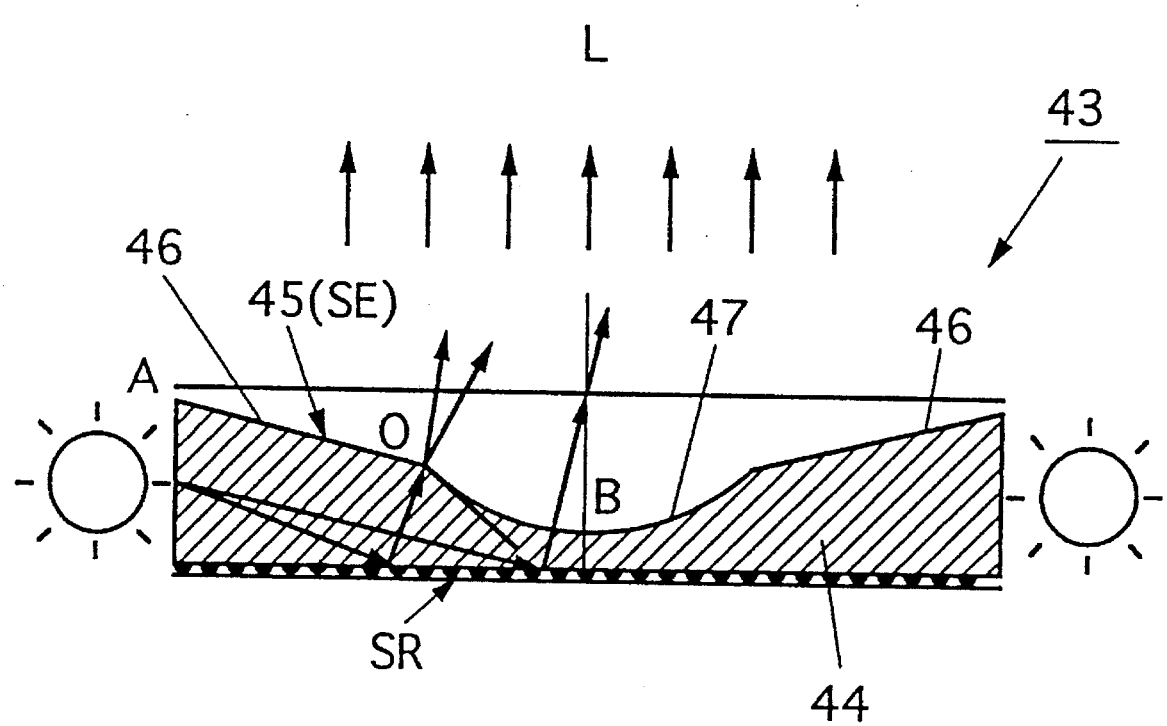
FIG. 9 is another explanatory view showing the behavior of the light, wherein the center of the light-guiding panel is a symmetrical concavity with two planes which is not tangentially adjoined thereto.
Figure 10:
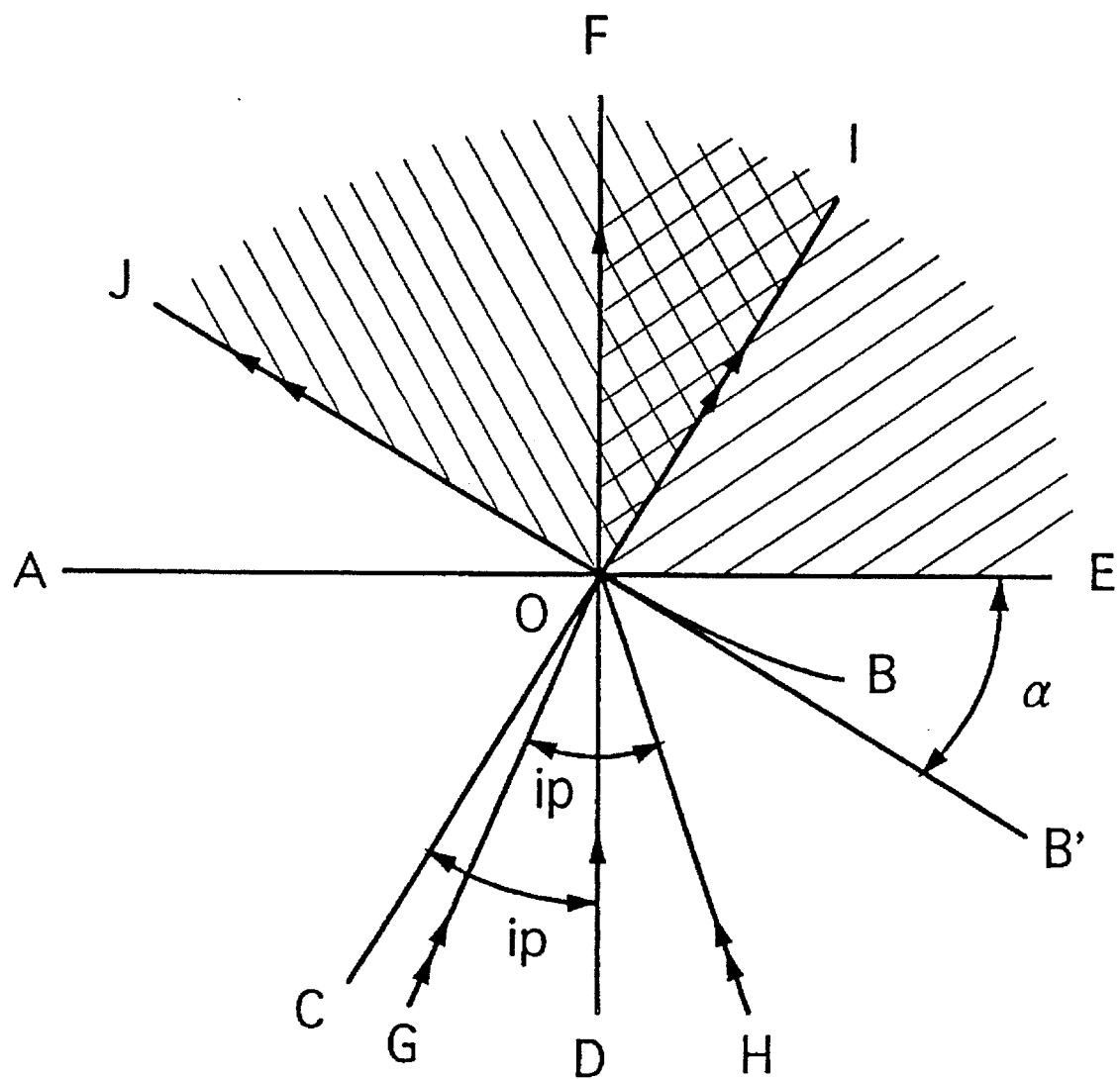
FIG. 10 is an explanatory view of the behavior of the light at the light-emitting surface in a light-guiding panel composed of a concavity and a tangential plane adjoined thereto.
Figure 11:
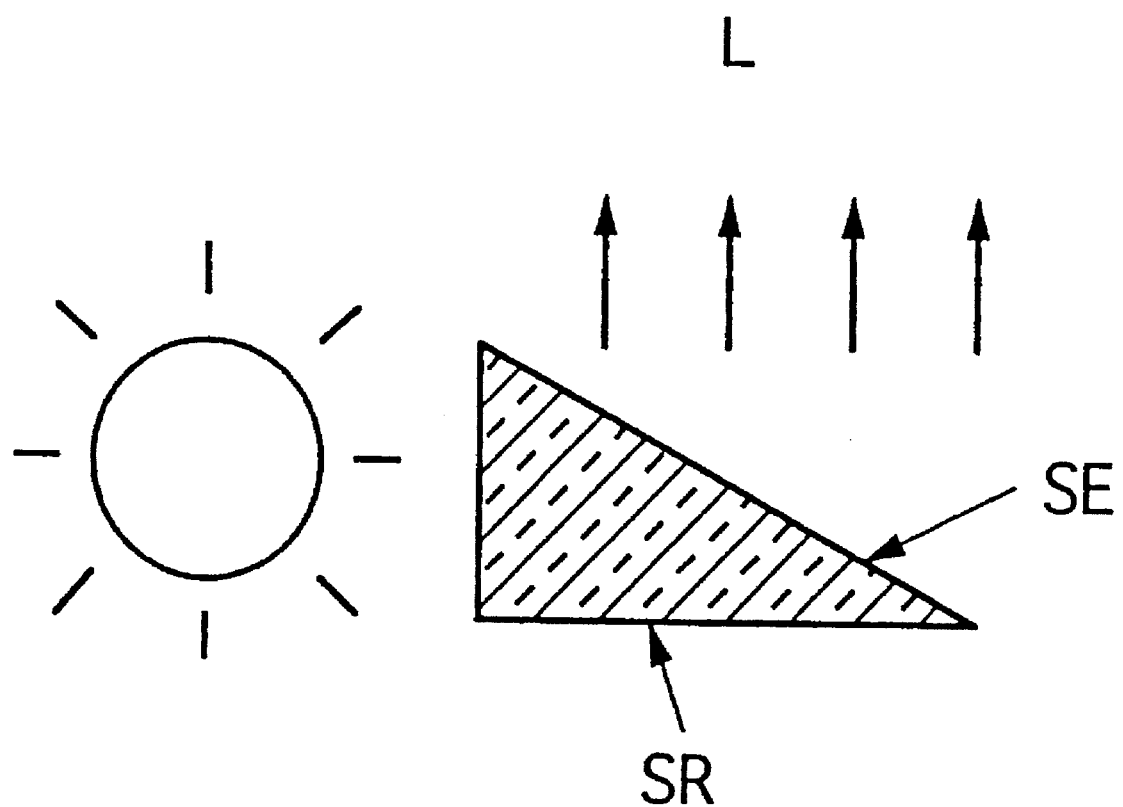
FIG. 11 is a diagrammatic section view of known wedge-shaped light-guiding panel.

In FIG. 6, in which the ratio is 1/23, a brilliant line is to occur at the center of the panel, the luminance decreasing gradually from the center area toward both of the panel end. This center weighted intensity is still evident even the ratio is changed to 1/11.76 as shown in FIG. 6B. The intensity variation improves substantially for a relatively small change from 1:11.76 to 1:9.5 as shown in FIG. 6C where it is seen that the average intensity across the face is substantially equivalent to the intensity at the center portion adjacent to and above the curved portion of the light guiding panel. The luminance uniformity is improved as the ratio approaches 1:6.13 as shown in FIG. 6D, it being noteworthy that the average luminance also increased. When the ratio was changed to 1:2.75, as shown in FIG. 6E, there is noted a slight decrease in the luminance at the central region.

It is understood that even luminance of the light guiding panel has been achieved by both the ratio of the distances C–G and C–F to the length of the hypotenuses AC and CE and the distribution of reflective dots 51a.

The light source assembly 52 is effective to induce an illuminating source of light into the light guiding panel body 51. The light source assembly 52 includes a plurality of elongate, tubular light tubes 52a disposed parallel and adjacent to the longitudinal edge of the light guiding panel body 51, that is, along the edge having constant thickness "a". Light tubes, including fluorescent and cold cathode discharge tubes, are most desirably adapted to the LCD package because of their comparatively small diameter, large luminous energy per unit length and low Operating temperature and heat generation. The light source assembly 52 also includes a power supply (not shown) to provide the high starting voltage necessary to excite the light tubes. The light source assembly 52 may comprise other light sources including conventional bulbs. However, tubular light sources adapt well to light guiding panel body 51 and provide high illumination density per unit of length. Light sources such as krypton, xenon or halogen lamps, which may be fabricated in tube or bulb configurations and which are charaterized by their intense white light, are considered inferior to the fluorescent or cold cathode lights due to the high amounts of generated heat and comparatively short life.

The light tubes 52a are longitudinally disposed adjacent opposed edge of the light guiding panel body 51. The induced light increases as the thickness "a" of the edges approaches (or exceeds) the outer diameter of the light source tube 52a. A desirable alternative to simply adapting the light tubes 52a to lay adjacent to the edge for example, is to provide a panel body 51 having light tube bores 52b disposed adjacent the edge, as shown FIG. 1, into which are disposed the light source tubes 52a. This provedes greater light coupling as well as provides a mechanical securing machanism to maintain the light source tubes 52a and light guiding panel body 51 in proper alignment.

FUNCTION AND OPERATION

The light-guiding panel of the present invention is capable of providing a LCD back lighting device substantially free of any brilliant line defects, unlike other light guiding panel which incorporate a curved portion and symmetrically disposed plane portions in their emitting face profile. The difference is that other designs have failed to appreciate the requirement that the plane portions be tangentially conjoined to the curved portion such that no discontinuities exist at the point of tangency.

Light-Guiding Panel Example 1

In a light guiding panel made in accorcance with this invention, an acrylic light-guiding panel, typical of the embodiment shown in FIG. 1, includes a light guiding panel body 51 with an edge thickness of 6 mm, 16 cm in the breadth, 20 cm in the height and 1 mm in the thickness at its central thinnest portion.

The curve portion 54 in a concave-plane face 56 the light guiding panel body 51 has a circular profile. From formulaI , the radius of the tangential circle is 35.63 cm. The ratio of GC to AC (=FC to EC) in FIG. 4 is 1/9.44.

The example also includes a plurality of white dots 51a comprising white pigment such as $TiO_2$ and transparent polymer such as acrylic resin disposed on the planer surface 57 of the light guiding panel body 51, which is illustrated in FIG. 1. The white dots 51a are printed by a method of silk screen printing, which is well-known in the art.

Besides, the white dots 51a are printed so that the density of the dots varies corresponding to a configuration of the panel body 51, more particularly, the density of the dots on a central zone Zc including the thinnest portion of the body 51 and on each peripheral zone Zp near a light source 52a is relatively high compared with the density of the dots on intermediate zones Zb,Zb between the central zone Zc and the periferal zone Zp. In other words, the printing ratio of the dots' area to a unit area of surface $S_R$ of the panel body 51 is as follows:

the central zone (Zc): 80±5% the periferal zone (Zp): 70±5% the intermediate zone (Zb): 56±5%

Provide that the printing ratio varies near a boundary of zones so that the boundary is unclear. And the range of a diameter of a dot is 0.3–1.2 mm (φ).

The panel body 51 also receives a reflective sheet 51b caused to be adhered to the planer surface 57, and a light diffusing covering 53 disposed on to the concave-plane face 56. Therefore, the concave-plane face 56 functions as the light-emitting face $S_E$ and the planer surface 57 functions as the light-reflecting face $S_R$.

Each cold cathode tube 52a is set to be faced to each edge of panel body 51 and is covered with the reflecting mirror sheet.

The resulting panel package measures 119.6 g in weight which corresponds to 52.4% by weight of entire flat plate of 6 mm thickness. Thus, in this way, the weight of known plane light-guiding panel was decreased down to about one-half.

Figure 5:
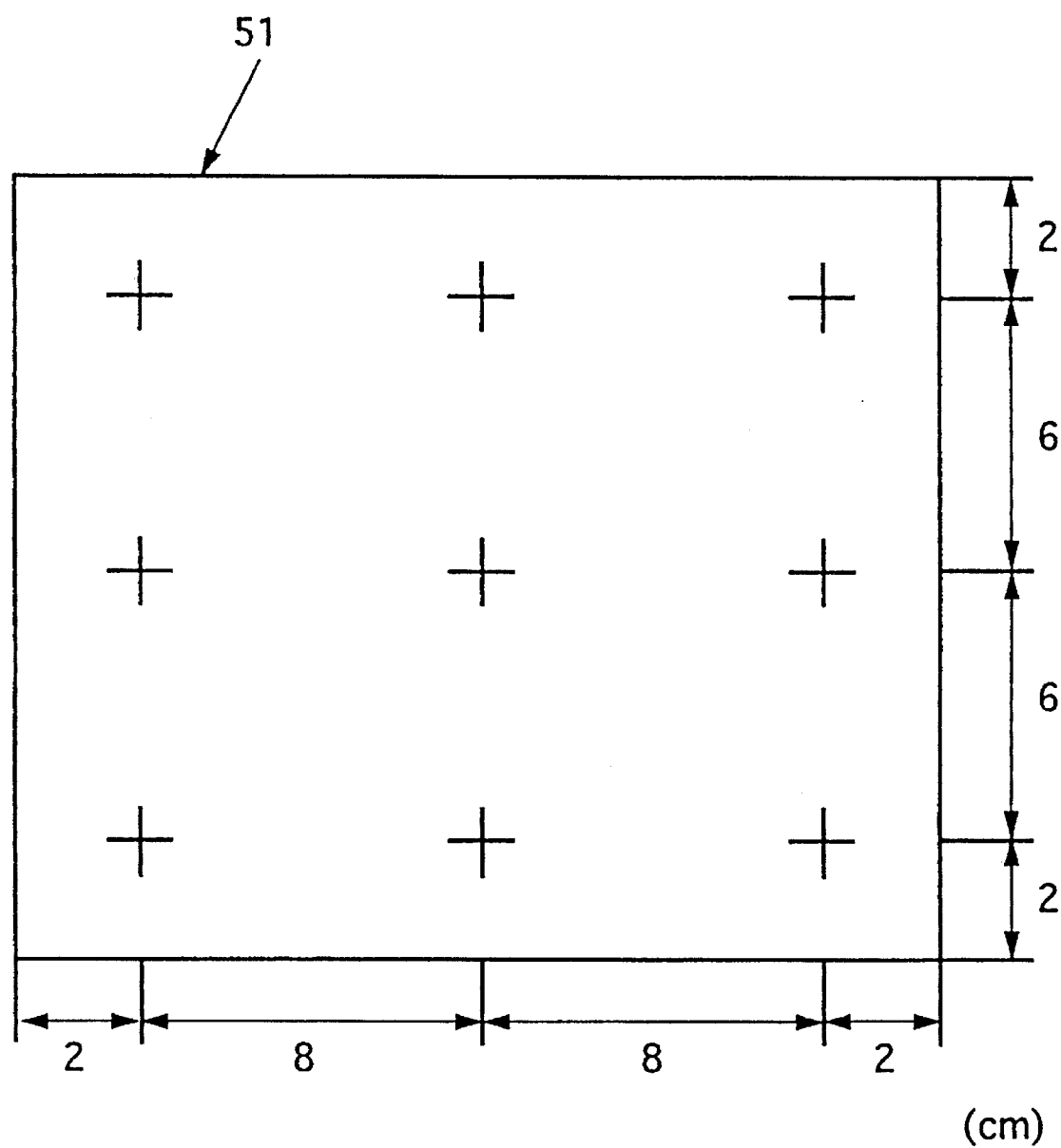
FIG. 5 is a plan view showing the positions at which the measurements of the luminance were carried out.

The luminance of the panel obtained above was measured a nine locations as shown in FIG. 5. The luminance measurements reveal an average luminance of 2050 cd/m² with 93% homogeneity as calculated by the following formula IV, and no substantial brilliant line defect.

$$\text{Homogeneity}(\%) = \frac{\text{Minimum luminance}}{\text{Maximum luminance}} \times 100 \qquad \text{Formula IV}$$

Light-Guiding Panel Example 2

Example 2 defines a light-guiding panel body fabricated from a clear acrylic plate, 10 mm thickness at its edge face, 16 cm in the breath and 20 cm in the height and with a machined parabolic profile shaped to a parabolic face having 2 mm thickness at it thinnest portion on a numerically controlled (NC) lathe according to the formula II-5 with $y=0.0195x^2+0.2$.

The obtained emitting surface profile is a parabola and was processed similar to example 1. And the ratio of GC to AC (=FC to EC) in FIG. 4 is 1/2.5.

This example also includes a plurality of white dots in the same manner with Example 1, except for the printing ratio. This printing ratio is as follows;

the central zone (Zc): 85±5% the periferal zone (Zp): 70±5% the intermediate zone (Zb): 60±5%

Provide that the printing ratio varies near a boundary of zones so that the boundary is unclear. And the range of a diameter of a dot is 0.3–1.2 mm (φ).

The resulting panel package measures 205.5 g in weight which corresponds to 52.7% by weight of entire flat plate of 10 mm thickness.

The average luminance of this panel, as 1950 cd/m² and the homogeneity, as 95% depends on the same manner with Example 1, and no substantial brilliant line defect.

Light-Guiding Panel Example 3

This light-guiding panel was processed similar to example 1 except that the white dots and the reflecting sheet were applied on the concave-plane face and the light diffusing covering was disposed on to the entire plane face.

The resulting panel is of a type shown in FIG. 2, and the printing ratio of the white dots is as follows;

the central zone (Zc): 75±5% the periferal zone (Zp): 70±5% the intermediate zone (Zb): 52±5%

Provide that the printing ratio varies near a boundary of zones so that the boundary is unclear. And the range of a diameter of a dot is 0.3–1.2 mm (φ).

The resulting panel package measures 119.6 g in weight which corresponds to 52.4% by weight of entire flat plate of 6 mm thickness. The average luminance of this panel, as 2100 cd/m² and the homogeneity, as 82% depends on the same manner with Example 1, and no substantial brilliant line defect.

Light-Guiding Panel Example 4

This light-guiding panel was processed similar to example 2 except that the white dots and the reflecting sheet were applied on the concave-plane face and the light diffusing covering was disposed on to the entire plane face.

The resulting panel is of a type shown in FIG. 2, and the printing ratio of the white dots is as follows;

the central zone (Zc): 80±5% the periferal zone (Zp): 70±5% the intermediate zone (Zb): 60±5%

Provide that the printing ratio varies near a boundary of zones so that the boundary is unclear. And the range of a diameter of a dot is 0.3–1.2 mm (φ).

The resulting panel package measures 205.5 g in weight which corresponds to 52.7% by weight of entire flat plate of 10 mm thickness.

The average luminance of this panel, as 2050 cd/m² and the homogeneity, as 85% depends on the same manner with Example 1, and no substantial brilliant line defect.

We claim:

1. A light-leading panel for surface-lightening, comprising:

an optically transparent plate having a thinnest portion at a center thereof, and white dots printed on a surface of said plate, wherein the surface with the white dots functions as a light-reflecting face, and wherein another surface opposite to the surface having the white dots functions as a light-emitting face when said panel is disposed in parallel with a light axis and the light is introduced from an end wall of said panel, wherein at least one surface of the plate is a synthesized face which includes a central symmetric concave side and two planes tangentially joined thereto so as to have a symmetric sectional form in cutting the plate along a line which includes the light axis and is vertical to said panel, wherein an outline of the symmetric sectional form includes two oppositely disposed straight lines each of which extends with an incline approaching the light axis from an edge corresponding to said end wall toward the center and an arcuate portion each end of which is tangentially joined to one end of each of the inclined straight lines, and wherein said outline also has a geometrical condition such that an intersection point (C) at which two hypothetical lines extending from each inclined straight line intersect one another, each outer end point (A, E) of each inclined straight line, each intersection point (B, D) at which a straight line passing through the intersection point (C) and also being parallel to the light axis and each straight line extending vertically from each outer end point (A, E) to the light axis intersect each other, two hypothetical rectangular triangles (ΔCAB, ΔCED) formed by connecting the points have the same size and the same shape and are symmetrically disposed by confronting each other at acute apexes thereof, and the length of each hypothetical line is set so as to be no less than ⅒ and no more than ⅔ of the length of the slant of each hypothetical rectangular triangle.

2. The light-leading panel according to claim 1, wherein the length of each hypothetical line is set to be no less than ⅕ and no more than ⅔ of the length of slant of each hypothetical rectangular triangle.

3. The light-leading panel according to claim 1, wherein the arcuate portion is a curve line which is formed of one of a conical arc, a curve of a trigonometric function, a catenary curve or hypabolic cosine curve, a cycloid, a trocoid, a curve of an exponential function and an involute curve, wherein said conical arc is one of a circular arc, a parabolic arc, a hypabolic arc and an elliptic arc.

4. The light-leading panel according to claim 3, wherein the curve line is one of a circular arc and a parabolic arc.

5. The light-leading panel according to claim 1, wherein the plate is hollow.

6. The light-leading panel according to either claim 1 or 5, wherein one surface of the plate is plane.

7. The light-leading panel according to either claim 1 or 5, wherein the plate has a pair of through-holes confronting each other disposed symmetrically along each of the end walls for disposing cold cathode discharge tubes.

8. A light-leading body, comprising a light-leading panel for surface-lightening, wherein said light-leading panel includes an optically transparent plate having a thinnest portion at a center thereof, and white dots printed on a surface of said plate, wherein the surface with the white dots functions as a light-reflecting face, and wherein another surface opposite to the surface having the white dots functions as a light-emitting face when said panel is disposed in parallel with a light axis and the light is introduced from an end wall of said panel, wherein at least one surface of the plate is a synthesized face which includes a central symmetric concave side and two planes tangentially joined thereto so as to have a symmetric sectional form in cutting the plate along a line which includes the light axis and is vertical to said panel, wherein an outline of the symmetric sectional form includes two oppositely disposed straight lines each of which extends with an incline approaching the light axis from an edge corresponding to said end wall toward the center and an arcuate portion each end of which is tangentially joined to one end of each of the inclined straight lines, wherein said outline also has a geometrical condition such that an intersection point (C) at which two hypothetical lines extending from each inclined straight line intersect one another, each outer end point (A, E) of each inclined straight line, each intersection point (B, D) at which a straight line passing through the intersection point (C) and also being parallel to the light axis and each straight line extending vertically from each outer end point (A, E) to the light axis intersect each other, two hypothetical rectangular triangles (ΔCAB, ΔCED) formed by connecting the points have the same size and the same shape and are symmetrically disposed by confronting each other at acute apexes thereof, and the length of each hypothetical line is set so as to be no less than ⅒ and no more than ⅔ of the length of the slant of each hypothetical rectangular triangle, and wherein the plate of the light-leading panel is arranged in parallel with a face which includes a pair of cold cathode discharge tubes oppositely disposed.

9. The light-leading body according to claim 8, wherein the plate is hollow.

10. The light-leading body according to either claim 8 or 9, wherein one surface of the plate is plane.

11. The light-leading body according to either claim 8 or 9, wherein the plate has a pair of through-holes confronting each other disposed symmetrically along each of the end walls for disposing cold cathode discharge tubes.

* * * * *